United States Patent

Nunome et al.

(10) Patent No.: US 9,209,431 B2
(45) Date of Patent: Dec. 8, 2015

(54) ALKALINE BATTERY

(71) Applicant: PANASONIC CORPORATION, Osaka (JP)

(72) Inventors: Jun Nunome, Kyoto (JP); Fumio Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 23 days.

(21) Appl. No.: 14/129,254

(22) PCT Filed: Feb. 25, 2013

(86) PCT No.: PCT/JP2013/001052
§ 371 (c)(1),
(2) Date: Dec. 24, 2013

(87) PCT Pub. No.: WO2014/002327
PCT Pub. Date: Jan. 3, 2014

(65) Prior Publication Data
US 2014/0349174 A1  Nov. 27, 2014

(30) Foreign Application Priority Data

Jun. 25, 2012 (JP) ................. 2012-141572

(51) Int. Cl.
*H01M 2/08* (2006.01)
*H01M 2/02* (2006.01)
*H01M 4/06* (2006.01)
(Continued)

(52) U.S. Cl.
CPC ............... *H01M 2/022* (2013.01); *H01M 4/06* (2013.01); *H01M 4/50* (2013.01); *H01M 4/62* (2013.01); *H01M 6/085* (2013.01); *H01M 4/46* (2013.01); *H01M 4/466* (2013.01)

(58) Field of Classification Search
CPC ................................ H01M 4/46; H01M 4/466
See application file for complete search history.

(56) References Cited

U.S. PATENT DOCUMENTS 5,342,712 A     8/1994  Mieczkowska et al.
5,599,644 A *   2/1997  Swierbut et al. ............. 429/224
(Continued)

FOREIGN PATENT DOCUMENTS

EP     0863561 A1    9/1998
EP     1 964 944 A1  9/2008
(Continued)

OTHER PUBLICATIONS

International Search Report issued in International Application No. PCT/JP2013/001052 mailed Apr. 2, 2013, 3 pgs.
(Continued)

*Primary Examiner* — Jane Rhee
(74) *Attorney, Agent, or Firm* — McDermott Will & Emery LLP

(57) ABSTRACT

In an alkaline battery in which a positive electrode 2 containing manganese dioxide, a negative electrode 3, and a separator 4 interposed therebetween are housed in a closed-end cylindrical battery case 1 whose opening is sealed with a gasket 5, a half-width of a 110 plane peak of the manganese dioxide measured by a powder X-ray diffraction analysis is in the range of 1.80-2.40 degrees, and anatase titanium dioxide is contained in the positive electrode such that a ratio of anatase titanium dioxide to the positive electrode is in the range of 0.10-1.50 mass %.

4 Claims, 1 Drawing Sheet

(51) Int. Cl.
*H01M 4/62* (2006.01)
*H01M 4/50* (2010.01)
*H01M 6/08* (2006.01)
*H01M 4/46* (2006.01)

(56) References Cited

U.S. PATENT DOCUMENTS

| | | | |
|---|---|---|---|
| 5,658,693 A * | 8/1997 | Thackeray et al. | 429/224 |
| 5,744,266 A | 4/1998 | Nunome et al. | |
| 5,928,714 A | 7/1999 | Nunome et al. | |
| 2009/0197169 A1 | 8/2009 | Nunome et al. | |
| 2012/0141361 A1 | 6/2012 | Suetsugu et al. | |

FOREIGN PATENT DOCUMENTS

| | | |
|---|---|---|
| JP | 08-510355 A | 10/1996 |
| JP | 2002-289186 A | 10/2002 |
| JP | 2003-163003 A | 6/2003 |
| JP | 2011-068552 A | 4/2011 |

OTHER PUBLICATIONS

Extended European Search Report issued in corresponding European Patent Application No. 13801969.0 on Jul. 7, 2015; 11 pages.

* cited by examiner

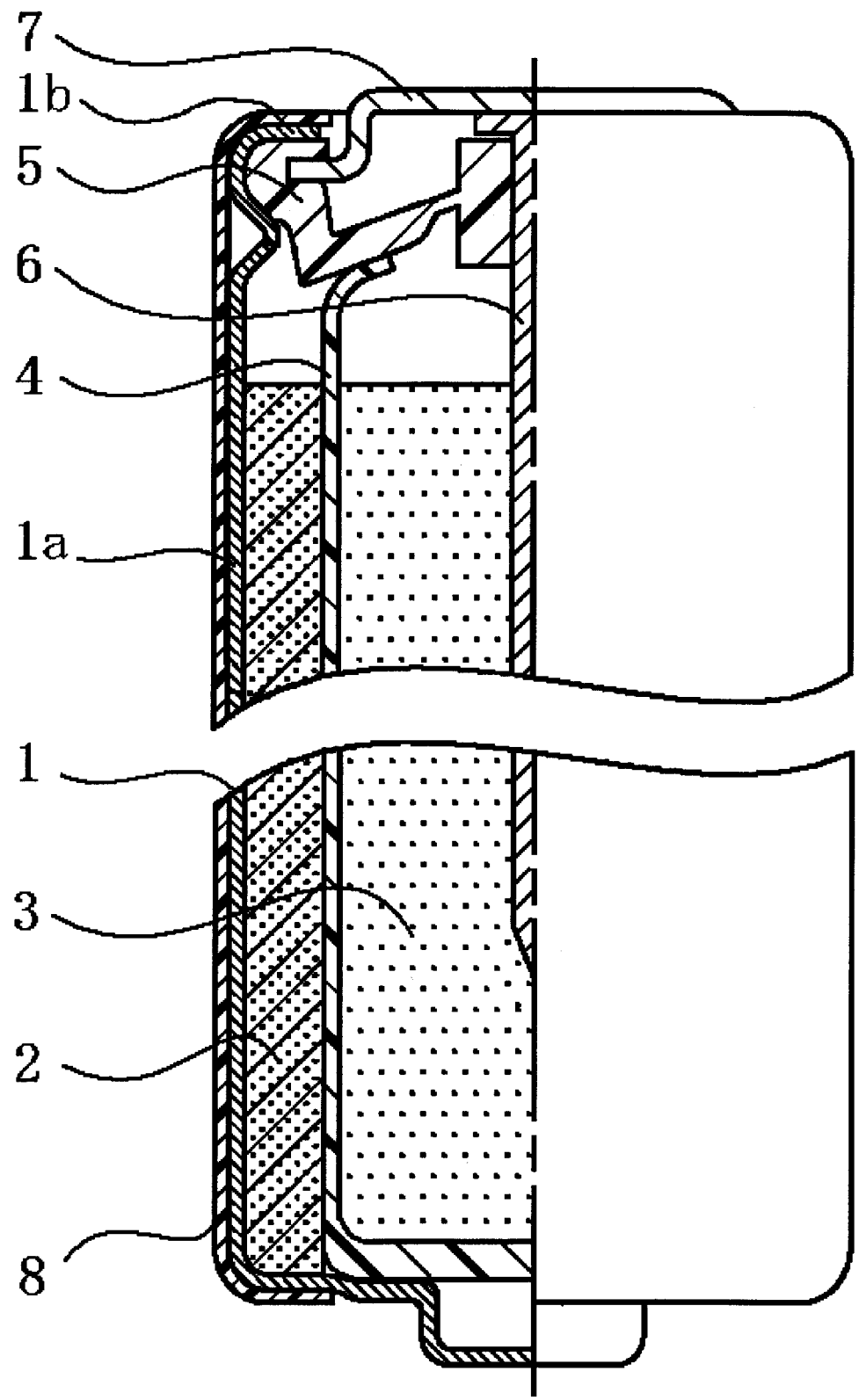

ALKALINE BATTERY

RELATED APPLICATIONS

This application is the U.S. National Phase under 35 U.S.C. §371 of International Application No. PCT/JP2013/001052, filed on Feb. 25, 2013, which in turn claims the benefit of Japanese Application No. 2012-141572, filed on Jun. 25, 2012, the disclosures of which are incorporated by reference herein.

TECHNICAL FIELD

The present disclosure relates to alkaline batteries using alkaline electrolyte.

BACKGROUND ART

Alkaline batteries are currently widely used as main power sources for toys as everyday items, game machines, mobile electronic equipment, and other devices, and are thus desired to have long lifetime when being used in such devices. To achieve a long driving time of a device, it is generally necessary to fill a battery with an active material as much as possible. The amount of the active material, however, has reached the limits because of its limited space. In addition, since nickel-metal hydride batteries and lithium batteries have often been used for discharge under high loads, alkaline batteries need to have more excellent discharge performance when used under a load from a low load (e.g., continuous discharge under a load of 39Ω per one battery) to an intermediate load (e.g., continuous discharge under a load of 10Ω per one battery).

Patent Document 1 describes a technique for improving discharge performance under each of an intermediate load and a high load by adding anatase titanium dioxide to a positive electrode.

Patent Document 2 describes a technique for improving discharge performance under an intermediate load by using manganese dioxide whose half-width of a 110 plane peak is 2.2-2.9 degrees and which has a high potential for a positive electrode.

CITATION LIST

Patent Document

[Patent Document 1] Japanese Unexamined Patent Publication No. H08-510355

[Patent Document 2] Japanese Unexamined Patent Publication No. 2011-68552

SUMMARY OF THE INVENTION

Technical Problem

To achieve a large capacity, it is effective to increase the reaction efficiency of manganese dioxide that is used as a positive electrode active material.

In an alkaline battery, however, polarization of the positive electrode increases as discharge progresses, and the battery is discharged to a cut-off voltage of discharge. Thus, a theoretical discharge capacity (about 284 mAh/g in the case of using manganese dioxide) cannot be achieved. The polarization increases for various reasons, such as decrease in ion diffusion due to consumption of water during discharge and deactivation by hetaerolite ($ZnO.Mn_2O_3$) that is a by-product produced by discharge from manganese dioxide.

To reduce such a decrease in discharge efficiency of manganese dioxide at the end of discharge, anatase titanium dioxide is added to reduce generation of hetaerolite. In conventional techniques, however, this addition is slightly advantageous but is insufficient for discharge under an intermediate load. In discharge under a low load, the advantage of the addition is canceled by a decrease in the amount of an active material due to the addition. Thus, conventional techniques cannot sufficiently improve discharge performance.

In addition, in controlling the crystal structure represented by the half-width of a 110 plane peak of manganese dioxide measured by powder X-ray diffraction analysis, discharge under a high load or an intermediate load originally shows large discharge polarization to have a small discharge availability of manganese dioxide, and thus, can achieve advantages easily. On the other hand, discharge under a low load cannot obtain significant advantages, and discharge under an intermediate load obtains insufficient advantages, either.

It is therefore an object of the present disclosure to provide a large-capacity alkaline battery exhibiting synergistic effects of optimization of manganese dioxide crystallinity and optimization of the amount of an additive in a positive electrode in order to increase a discharge capacity under each of a low load and an intermediate load.

Solution to the Problem

To achieve the object, according to an aspect of the present, in an alkaline battery in which a positive electrode containing manganese dioxide, a negative electrode, and a separator interposed therebetween are housed in a closed-end cylindrical battery case whose opening is sealed with a gasket, a half-width of a 110 plane peak of the manganese dioxide measured by a powder X-ray diffraction analysis is in the range of 1.80-2.40 degrees, and anatase titanium dioxide is contained in the positive electrode such that a ratio of anatase titanium dioxide to the positive electrode is in the range of 0.10-1.50 mass %.

Advantages of the Invention

The present disclosure provides an alkaline battery that can reduce polarization of a positive electrode at the end of discharge to achieve a large capacity in discharge under each of a low load or an intermediate load.

BRIEF DESCRIPTION OF THE DRAWINGS

FIG. 1 is a half-sectional view illustrating a configuration of an alkaline battery according to the present disclosure.

DESCRIPTION OF EMBODIMENTS

According to the present disclosure, in an alkaline battery in which a positive electrode containing manganese dioxide, a negative electrode, and a separator interposed therebetween are housed in a closed-end cylindrical battery case whose opening is sealed with a gasket, the half-width of a 110 plane peak of the manganese dioxide measured by a powder X-ray diffraction analysis is in the range of 1.80-2.40 degrees, and the positive electrode contains anatase titanium dioxide in such a manner that a ratio of anatase titanium dioxide to the positive electrode is in the range of 0.10-1.50 mass %.

As described above, deactivation of the surface of manganese dioxide due to generation of hetaerolite at the end of discharge of manganese dioxide is a factor of a decreased availability in discharge under an intermediate load and discharge under a low load. In view of this, anatase titanium dioxide is added to the manganese dioxide positive electrode in order to reduce generation of hetaerolite and, thereby, increase the availability of manganese dioxide.

However, anatase titanium dioxide does not contribute to discharge as an active material and has a lower density than that of manganese dioxide. Thus, the addition of anatase titanium dioxide disadvantageously reduces the amount of manganese dioxide that is an active material.

As in the case of discharge under an intermediate load, in a case where the availability of manganese dioxide is originally as low as 70%, the addition of about 1 mass % of anatase titanium dioxide is sufficient to increase the availability and, thereby, increase the discharge capacity of the positive electrode as a whole, even with a slight decrease in the amount of manganese dioxide. On the other hand, in the case of discharge under a low load as in the case of continuous discharge with 39Ω or less in an AA alkaline battery, for example, the availability is originally as high as 90%, and thus, the addition of anatase titanium dioxide hardly increases the discharge capacity. Since generation of hetaerolite is sufficiently reduced, the addition of only about 1 mass % of anatase titanium dioxide reduces the amount of manganese dioxide, and thus, the discharge capacity disadvantageously decreases as a whole.

Inventors of the present disclosure have intensively studied, to find that the decrease in efficiency in utilization of manganese dioxide and the mechanism of improvement by anatase titanium dioxide are both surface reaction of manganese dioxide, and therefore, are affected by crystallinity of manganese dioxide, and that the capacity is most effectively increased under optimum conditions for the mixture ratio of anatase titanium dioxide and the crystallinity of manganese dioxide.

The half-width of a 110 plane peak of manganese dioxide measured by a powder X-ray diffraction analysis is supposed to reflect the size of crystallite, which is particle crystal of manganese dioxide, and reflect a reactive surface area of manganese dioxide.

It is generally expected that excessively large primary particles reduce the surface area of manganese dioxide that causes discharge reaction when being in contact with an electrolyte, and as a result, the discharge efficiency decreases. The inventors, however, found that when the mixture ratio of anatase titanium dioxide and the half-width of a 110 plane peak indicating the size of primary particles are determined to be in optimum ranges, the reaction efficiency of manganese dioxide is maximized, and the performance of discharge under an intermediate load and a low load significantly improves.

Although generation reaction of hetaerolite is not known, a large amount of $Mn^{3+}$ ions or $Mn^{2+}$ ions that are discharge products are present in the surfaces of manganese dioxide particles at the end of discharge of manganese dioxide, and these ions are slowly diffused into the entire positive electrode. The $Mn^{3+}$ ions or $Mn^{2+}$ ions are expected to react with $Zn^{2+}$ ions in the manganese dioxide surface accordingly, and hetaerolite that is inactive in discharge reaction is generated in the manganese dioxide surface. Thus, the surfaces of manganese dioxide particles and the shape of crystal thereof are closely related to each other as reaction fields for hetaerolite.

In the crystal of manganese dioxide, needle-shaped primary particles each of a size of several ten nanometers are agglomerated to from secondary particles. Thus, individual primary particles expand at the end of discharge, and the agglomeration thereof is loosened. In other words, the secondary particles are broken at the end of discharge to have their surface area increases. The inventors of the present disclosure focused on this phenomenon.

Specifically, the inventors assumed that since the surface area of the manganese dioxide particles increases at the end of discharge so that hetaerolite is generated in a larger area, a large amount of anatase titanium dioxide is needed to reduce generation of hetaerolite. Based on this assumption, it is expected that in manganese dioxide having high degree of crystallinity and showing less breakage of agglomeration even at the end of discharge, a relatively small amount of anatase titanium dioxide efficiently reacts to reduce generation of hetaerolite.

The crystal of manganese dioxide will now be described. The 110 plane peak is a distinct peak seen at an angle 2θ (where θ is the X-ray incident angle) of about 22±1° in the powder X-ray diffraction analysis, and is used to represent a plane corresponding to the 110 plane peak when the manganese dioxide is assumed to have a ramsdellite structure.

A small half-width of the 110 plane peak thereof measured by a powder X-ray diffraction analysis indicates a regular crystalline arrangement. That is, the small half-width of the 110 plane peak means that Mn atoms and O atoms are regularly arranged, and that primary crystalline particles are relatively large. Extension of the distance between atoms occurring when H atoms enter the array of Mn atoms and O atoms at the end of discharge reduces occurrence of distortion of crystalline particles, and thus, allows strain to be within crystals.

On the other hand, when the half-width of the 110 plane peak is large, entering of H atoms due to discharge causes distortion of secondary particles due to strain arising from a variation of the distance between atoms in crystals and also causes an increase in size of pores in appearance. Thus, at the end of discharge, an increase in the reactive surface area of the positive electrode is reduced with decreasing half-width of the 110 plane peak measured by a powder X-ray diffraction analysis.

In addition, as described above, manganese dioxide having regular arrangement of Mn atoms and O atoms and including relatively large primary crystalline particles has high electron conductivity.

Considering the foregoing facts, generation of hetaerolite due to addition of anatase titanium dioxide in the manganese dioxide surface at the end of discharge is expected to be reduced by using manganese dioxide having a small half-width of the 110 plane peak and regular crystalline arrangement.

In the present disclosure, generation of hetaerolite at the end of discharge can be effectively reduced, and thus, the discharge capacity of the battery under each of a low load and an intermediate load can be increased as long as the half-width of a 110 plane peak of the manganese dioxide is in the range of 1.80-2.40 degrees, and the positive electrode contains anatase titanium dioxide in such a manner that a ratio of anatase titanium dioxide to the positive electrode is in the range of 0.10-1.50 mass %.

When the amount of anatase titanium dioxide in the positive electrode is in the range of 0.20-0.70 mass %, an increase in polarization at the end of discharge is more effectively reduced.

A half-width of the 110 plane peak of manganese dioxide within the range of 1.90-2.15 degrees can more effectively reduce expansion of manganese dioxide at the end of discharge.

The potential of manganese dioxide is preferably 250-310 mV with respect to a mercury/mercurous oxide electrode in a 40 mass % KOH aqueous solution. An initial open-circuit voltage of an alkaline battery using this manganese dioxide is preferably 1.60-1.64 V.

In a preferred embodiment, the body of the battery case has a thickness of 0.12-0.19 mm Such a thin body of the positive electrode case allows a larger amount of a positive electrode material to be contained, and can achieve a larger capacity. The thickness of the body of the battery case is more preferably 0.12-0.15 mm.

An embodiment of the present disclosure will be described with reference to the drawings. In the drawings, like reference characters have been used to designate identical or equivalent elements for simplicity of description. The present disclosure is not limited to the following embodiment.

FIG. 1 is a half-sectional view illustrating a configuration of an alkaline battery according to this embodiment.

As illustrated in FIG. 1, a positive electrode 2, a negative electrode 3, and a separator 4 interposed between the positive and negative electrodes 2 and 3 are housed in a closed-end cylindrical battery case 1 whose opening 1b is sealed with a gasket 5 and a negative electrode terminal plate 7.

The positive electrode 2 contains manganese dioxide whose half-width of the 110 plane peak measured by a powder X-ray diffraction analysis is within the range of 1.80-2.40 degrees.

The half-width of the 110 plane peak of manganese dioxide measured by a powder X-ray diffraction analysis used herein is a half-width of a diffraction line of the 110 plane peak at an angle 2θ of about 22±1° in a diffraction pattern obtained by general X-ray diffraction using CuKα radiation source.

The half-width of the 110 plane peak of manganese dioxide can also be obtained from a positive electrode taken by disassembling an unused battery. In this case, an alkaline electrolyte is washed away immediately after disassembly, and a positive electrode that has been dried in a dry atmosphere at room temperature is measured by an X-ray diffraction analysis.

The ratio of graphite contained in the positive electrode is preferably in the range of 4.0-7.0 mass %. The type and particle size, for example, of graphite are not specifically limited, and high-purity artificial graphite with an average particle size of 10-25 μm is preferable because such graphite eases molding of the positive electrode. Natural graphite or expanded graphite in a scaly shape of the same size may also be used. Alternatively, carbon black or carbon fibers, for example, may be added as a positive electrode conductive agent, a small amount of polyethylene powder, for example, may be added as a binder, and stearate, for example, may be added as a lubricant.

The crystal structure of manganese dioxide may be any one of a gamma type or an epsilon type. Further, in addition to manganese dioxide, oxy nickel hydroxide, silver oxide, or copper oxide, for example, may be contained as a positive electrode active material. It is preferable to use high-density electrolytic manganese dioxide showing excellent discharge performance.

Manganese dioxide according to the present disclosure is preferably particles having an average particle size of 30-60 μm, and more preferably 35-45 μm. The degree of oxidation of manganese (Mn) is preferably as high as possible, and the valence of Mn is preferably 3.9-4.0.

The mass loss rate, which reflects the percentage of Mn vacancies in manganese dioxide, is preferably in the range of 3.1-3.9 mass % and is more preferably in the range of 3.2-3.7 mass % in terms of discharge performance. The mass loss rate herein is obtained by dividing the difference between the mass at 400° C. and the mass at 100° C. by the mass at room temperature.

The BET specific surface area of manganese dioxide is preferably 22-34 m²/g.

The type of the negative electrode 3 of the present disclosure is not specifically limited, and is preferably obtained by gelling with zinc powder as an active material, an alkaline electrolyte, and a gelling agent. The discharge capacity ratio between the positive and negative electrodes is such that the theoretical discharge capacity of the negative electrode to that of the positive electrode is preferably 1.00-1.25, and more preferably 1.07-1.17 in terms of excellent discharge performance. The discharge capacities in this case are such that the theoretical discharge capacity of manganese dioxide is 284 mAh/g and the discharge capacity of zinc is 710 mAh/g.

Zinc powder as the active material may be zinc alloy powder. The zinc alloy powder preferably has a high corrosion resistance, and is more preferably free from mercury, cadmium, and/or lead, for environmental protection. The zinc alloy may contain 0.01-0.1 mass % of indium, 0.005-0.02 mass % of bismuth, and 0.001-0.05 mass % of aluminium, for example. The zinc alloy may contain only one or more of these alloy components.

The alkaline electrolyte may be an aqueous solution containing potassium hydroxide as a main component, and preferably an aqueous solution containing 32.5-34.5 mass % of potassium hydroxide and 1.0-3.0 mass % of zinc oxide. A small amount of a silica compound is preferably added to the negative electrode because such addition reduces expansion of the positive electrode and the negative electrode. Specifically, 0.1-0.3 mass % of $Na_2SiO_3$ is preferably added.

The positive electrode preferably has a crack with a width of 2-10 μm formed by placing the positive electrode in the shape of a hollow cylindrical pellet into the battery case 1 and then molding the positive electrode again in the battery case under pressure. Specifically, in an AA battery, the positive electrode pellet is preferably molded again under a weight of 0.4-1.5 t because this re-molding can reduce the stress of expansion of manganese dioxide due to discharge.

The separator 4 herein may be a nonwoven fabric sheet of a mixture of various types of chemical fibers or a porous sheet of a synthetic resin such as cellophane or polyolefin, for example.

EXAMPLES

The structure and advantages of the present disclosure will be further described hereinafter using examples of the present disclosure. The present disclosure is not limited to these examples.

(Fabrication of Alkaline Battery)

An AA alkaline battery (LR6) illustrated in FIG. 1 was prepared through the following steps <1> to <7>.

<1> Battery Case

A nickel plated steel plate was pressed into a closed-end cylindrical battery case 1. The battery case 1 had a body 1a with a thickness of 0.17 mm.

<2> Separator

A nonwoven fabric sheet having a basic weight of 25 g/m² and a thickness of 0.09 mm and mainly containing intertwined solvent-spun cellulose fibers and polyvinyl alcohol-based fibers at a mass ratio of 1:1 was wound three times to prepare a closed-end separator 4.

<3> Sealing Unit

A gasket 5 was prepared by injection-molding nylon 6,6 as a main component into a predetermined shape with predetermined dimensions. A negative electrode terminal plate 7 was prepared by pressing a nickel plated steel plate into a predetermined shape with predetermined dimensions. A negative electrode current collector 6 was prepared by performing tin plating on the surface of brass pressed into a nail shape. After the negative electrode current collector 6 has been electrically welded to the negative electrode terminal plate 7, the negative electrode current collector 6 was pressed and inserted into a through hole at the center of the gasket 5, thereby obtaining a sealing unit.

<4> Alkaline Electrolyte

An alkaline electrolyte of an aqueous solution containing 34.0 mass % of potassium hydroxide and 2.0 mass % of zinc oxide was prepared.

<5> Positive Electrode

Manganese dioxide powder with an average particle size of 40 µm, graphite powder, and anatase titanium dioxide were mixed at a mass ratio of 94:6:0.4. In this mixture, graphite powder SP20 produced by Nippon Graphite Industries, ltd was used, and Titanium oxide, anatase, 99.9%, produced by Wako Pure Chemical Industries, Ltd. was used as anatase titanium dioxide.

This mixture and an alkaline electrolyte were mixed at a mass ratio of 100:1.9 and were sufficiently stirred, and the resulting mixture was press-formed into a flake shape. Then, the flake-shaped mixture was crashed into a granular shape, and was press-formed into a hollow cylindrical shape, thereby obtaining a pellet-shaped positive electrode 2. The press-formation of the pellet was performed under a constant pressure independently of crystallinity of manganese dioxide and the amount of anatase titanium dioxide, and the mass of the mixture was adjusted so that the pellets had an identical height.

The manganese dioxide powder was electrolytic manganese dioxide prepared in the following manner.

A round-bottom separable flask having a capacity of 2 L was used as an electrolytic bath, a titanium sheet of a size of 5 cm×5 cm with a thickness of 1 mm was used as an anode, and a platinum sheet of a size of 3 cm×3 cm with a thickness of 0.2 mm was used as a cathode. A pair of cathodes sandwich the anode and were spaced 2 cm apart from the lateral sides of the anode. An aqueous solution having a sulfuric acid concentration of 15 g/L and a manganese sulfate concentration of 70 g/L was used as a solution for the electrolytic bath at the start of electrolysis. Reagent chemicals made by KANTO CHEMICAL CO., INC. were used as manganese sulfate and sulfuric acid. In consideration of a change caused by electrolysis reaction, the hydrogen ion concentration (the sulfuric acid concentration) was changed at a substantially constant rate such that the sulfuric acid concentration reached 19 g/L at the end of 24-hour electrolysis. In this example, sulfuric acid, pure water, and a solution of manganese sulfate were supplied to the electrolytic bath at substantially constant rates. The manganese sulfate concentration was kept unchanged from the start to the end of the electrolysis. The electrolytic temperature was kept at 95±1° C. by adjusting the temperature of the electrolytic bath with a mantle heater, and electrolysis was continuously carried out for 24 hours.

The electrolytic current had an average current value described below, and was a variable current serving as a sine wave having an amplitude of 20% of that of the average current value and a frequency of 0.01 Hz. The half-widths of the 110 plane peak of electrolytic manganese dioxide measured by a powder X-ray diffraction analysis were 1.70, 1.80, 1.90, 2.00, 2.15, 2.30, 2.40, and 2.60 degrees by changing the average current value to 19, 22, 25, 29, 35, 41, 45, and 52 A/m$^2$, respectively.

After completion of the electrolysis, manganese dioxide was separated from the titanium sheet, and coarsely crashed into particles of a size of about 300 µm. The particles were washed with deionized water at 60° C., and were washed with water by means of decantation until the pH of the aqueous solution reached 6. Then, the manganese dioxide was dried, and crashed to an average particle size of 40 µm. Thereafter, 10 g of the resulting powder was supplied with 100 mL of deionized water. While this mixture was being stirred, 0.1 N of a sodium hydroxide aqueous solution was dropped onto the mixture, and the mixture was neutralized until the pH of a supernatant fluid of the mixture reached 6. Thereafter, the resulting powder was dried with hot air at 90° C. for two hours, thereby obtaining manganese dioxide for use in the positive electrode.

<6> Negative Electrode

A gelling agent (a thickener of cross-linked and branched polyacrylic acid and water-absorbent polymer of highly cross-linked chain sodium polyacrylate), an alkaline electrolyte, and zinc alloy powder were mixed at a mass ratio of 0.26:0.54:35.2:64.0 to obtain a negative electrode 3. The zinc alloy powder contained 0.02 mass % of indium, 0.01 mass % of bismuth, and 0.005 mass % of aluminium.

<7> Assembly of Alkaline Battery

The pellet-shaped positive electrode 2 was inserted in the battery case 1, and pressed with a pressing jig into close contact with the inner wall of the battery case 1. After the separator 4 had been placed at the center of the positive electrode 2 that was in close contact with the inner wall of the battery case 1, the separator 4 and the positive electrode 2 were caused to absorb an electrolyte, and then the internal space of the separator 4 was filled with a predetermined amount of the negative electrode 3. Thereafter, the opening of the battery case 1 was sealed by crimping with a sealing unit interposed between the end of the opening and the sealing unit, and then the outer surface of the battery case 1 was covered with an external label 8.

(Evaluation of Discharge Performance)

The assembled alkaline battery was aged for three days under 40° C., and cooled to 20° C., so that the resulting battery was used as a sample battery for evaluation in a thermostat at 20° C.

The discharge performance under a low load was evaluated by continuously discharging batteries with a constant resistance of 39Ω and obtaining the time until the voltage reached 0.9 V. The discharge performance under an intermediate load was evaluated by continuously discharging batteries with a constant resistance of 10Ω and obtaining the time until the voltage reached 0.9 V.

Each of the above evaluations was conducted by discharging three sample batteries and obtaining the average value. Each discharge performance (i.e., the time until the voltage reached 0.9V) was obtained as an index where the discharge performance of a battery in which no anatase titanium dioxide is added and a half-width of a 110 plane peak of manganese dioxide obtained by powder X-ray diffraction analysis was 2.60 degrees was assumed to be 100.

(1) Conventional Alkaline Battery

The steps <1> to <7> were performed to obtain batteries S1-S6 in which the content of anatase titanium dioxide in the positive electrode was varied within the range of 0-5.0 mass % in manganese dioxide whose half-width of the 110 plane peak was 2.60 degrees.

Table 1 shows results of evaluation on discharge performance of the batteries under a low load and an intermediate load.

TABLE 1

|  | PERCENTAGE OF ANATASE TITANIUM DIOXIDE IN POSITIVE ELECTRODE [MASS %] | HALF-WIDTH OF 110 PLANE OF MANGANESE DIOXIDE MEASURED BY POWDER X-RAY DIFFRACTION ANALYSIS [DEGREE] | DISCHARGE PERFORMANCE IN 39-Ω CONTINUOUS DISCHARGE [INDEX] | DISCHARGE PERFORMANCE IN 10-Ω CONTINUOUS DISCHARGE [INDEX] |
| --- | --- | --- | --- | --- |
| BATTERY S1 | 0 | 2.60 | 100 | 100 |
| BATTERY S2 | 0.1 | 2.60 | 100 | 101 |
| BATTERY S3 | 0.4 | 2.60 | 99 | 103 |
| BATTERY S4 | 1.0 | 2.60 | 98 | 105 |
| BATTERY S5 | 1.5 | 2.60 | 97 | 100 |
| BATTERY S6 | 5.0 | 2.60 | 94 | 96 |

Table 1 shows that batteries S1-S4 in each of which the content of anatase titanium dioxide in the positive electrode was 0-1.0 mass % improved discharge performance under an intermediate load but showed discharge performance less than 100 under a low load and had their discharge performance under a low load degraded as the content of anatase titanium dioxide increased. Batteries S5 and S6 in each of which the content of anatase titanium dioxide in the positive electrode was 1.5-5.0 mass % showed more degraded discharge performance under a low load and also showed degraded discharge performance under an intermediate load.

(2) The Amount of Anatase Titanium Dioxide Contained in Positive Electrode

The steps <1> to <7> were performed to obtain batteries A7-A36 in which the content of anatase titanium dioxide in the positive electrode was varied within the range of 0-5.0 mass % in manganese dioxides whose half-widths of the 110 plane peaks were respectively 2.40, 2.15, and 1.80 degrees, which are smaller than those in conventional batteries.

Table 2 shows results of evaluation of discharge performance of these batteries under each of a low load and an intermediate load.

TABLE 2

|  | PERCENTAGE OF ANATASE TITANIUM DIOXIDE IN POSITIVE ELECTRODE [MASS %] | HALF-WIDTH OF 110 PLANE OF MANGANESE DIOXIDE MEASURED BY POWDER X-RAY DIFFRACTION ANALYSIS [DEGREE] | DISCHARGE PERFORMANCE IN 39-Ω CONTINUOUS DISCHARGE [INDEX] | DISCHARGE PERFORMANCE IN 10-Ω CONTINUOUS DISCHARGE [INDEX] |
| --- | --- | --- | --- | --- |
| BATTERY A7 | 0 | 2.40 | 100 | 100 |
| BATTERY A8 | 0.05 | 2.40 | 100 | 101 |
| BATTERY A9 | 0.10 | 2.40 | 101 | 103 |
| BATTERY A10 | 0.20 | 2.40 | 102 | 105 |
| BATTERY A11 | 0.40 | 2.40 | 103 | 107 |
| BATTERY A12 | 0.70 | 2.40 | 102 | 106 |
| BATTERY A13 | 1.00 | 2.40 | 101 | 105 |
| BATTERY A14 | 1.50 | 2.40 | 101 | 103 |
| BATTERY A15 | 2.00 | 2.40 | 99 | 101 |
| BATTERY A16 | 5.00 | 2.40 | 96 | 98 |
| BATTERY A17 | 0 | 2.15 | 100 | 100 |
| BATTERY A18 | 0.05 | 2.15 | 100 | 106 |
| BATTERY A19 | 0.10 | 2.15 | 102 | 108 |
| BATTERY A20 | 0.20 | 2.15 | 103 | 110 |
| BATTERY A21 | 0.40 | 2.15 | 104 | 112 |
| BATTERY A22 | 0.70 | 2.15 | 103 | 111 |
| BATTERY A23 | 1.00 | 2.15 | 103 | 109 |
| BATTERY A24 | 1.50 | 2.15 | 102 | 107 |
| BATTERY A25 | 2.00 | 2.15 | 100 | 105 |
| BATTERY A26 | 5.00 | 2.15 | 99 | 103 |
| BATTERY A27 | 0 | 1.80 | 100 | 100 |
| BATTERY A28 | 0.05 | 1.80 | 100 | 103 |
| BATTERY A29 | 0.10 | 1.80 | 101 | 104 |
| BATTERY A30 | 0.20 | 1.80 | 102 | 106 |
| BATTERY A31 | 0.40 | 1.80 | 103 | 110 |
| BATTERY A32 | 0.70 | 1.80 | 102 | 108 |
| BATTERY A33 | 1.00 | 1.80 | 102 | 106 |
| BATTERY A34 | 1.50 | 1.80 | 101 | 103 |
| BATTERY A35 | 2.00 | 1.80 | 99 | 100 |
| BATTERY A36 | 5.00 | 1.80 | 98 | 96 |

That is, in a battery using manganese dioxide whose half-width is about 2.60 such as a conventional battery, addition of a certain range of amount of anatase titanium dioxide to a positive electrode can enhance discharge performance under an intermediate load but the addition of anatase titanium dioxide cannot improve discharge performance under a low load.

Table 2 shows that among batteries A7-A16 using manganese dioxide whose half-width was 2.40, batteries A9-A14 in each of which the content of anatase titanium dioxide in the positive electrode was 0.10-1.5 mass % shows improved discharge performance more than 100 under each of a low load and an intermediate load.

Batteries A10-A12 in each of which the content of anatase titanium dioxide was 0.20-0.70 mass % showed more improved discharge performance under each of a low load and an intermediate load.

Batteries A17-A26 and A27-A36 using manganese dioxides whose half-widths are 2.15 and 1.80 also showed similar tendency. This tendency shows that the amount of anatase titanium dioxide has optimum values.

(3) Half-Width of 110 Plane Peak of Manganese Dioxide

The steps <1> to <7> were performed to obtain batteries B37-B60 in each of which the half-width of a 110 plane peak of manganese dioxide was varied within the range of 1.70-2.60 degrees using manganese dioxides in which the contents of anatase titanium dioxide in the positive electrodes were 0.1 mass %, 0.4 mass %, and 1.5 mass %.

Table 3 shows results of evaluation of discharge performance of these batteries under a low load and an intermediate load.

TABLE 3

| | PERCENTAGE OF ANATASE TITANIUM DIOXIDE IN POSITIVE ELECTRODE [MASS %] | HALF-WIDTH OF 110 PLANE OF MANGANESE DIOXIDE MEASURED BY POWDER X-RAY DIFFRACTION ANALYSIS [DEGREE] | DISCHARGE PERFORMANCE IN 39-$\Omega$ CONTINUOUS DISCHARGE [INDEX] | DISCHARGE PERFORMANCE IN 10-$\Omega$ CONTINUOUS DISCHARGE [INDEX] |
|---|---|---|---|---|
| BATTERY B37 | 0.10 | 2.60 | 100 | 101 |
| BATTERY B38 | 0.10 | 2.40 | 101 | 103 |
| BATTERY B39 | 0.10 | 2.30 | 101 | 105 |
| BATTERY B40 | 0.10 | 2.15 | 102 | 108 |
| BATTERY B41 | 0.10 | 2.00 | 103 | 110 |
| BATTERY B42 | 0.10 | 1.90 | 102 | 107 |
| BATTERY B43 | 0.10 | 1.80 | 101 | 104 |
| BATTERY B44 | 0.10 | 1.70 | 100 | 100 |
| BATTERY B45 | 0.40 | 2.60 | 99 | 103 |
| BATTERY B46 | 0.40 | 2.40 | 103 | 107 |
| BATTERY B47 | 0.40 | 2.30 | 104 | 109 |
| BATTERY B48 | 0.40 | 2.15 | 104 | 112 |
| BATTERY B49 | 0.40 | 2.00 | 105 | 113 |
| BATTERY B50 | 0.40 | 1.90 | 104 | 112 |
| BATTERY B51 | 0.40 | 1.80 | 103 | 110 |
| BATTERY B52 | 0.40 | 1.70 | 101 | 98 |
| BATTERY B53 | 1.50 | 2.60 | 97 | 100 |
| BATTERY B54 | 1.50 | 2.40 | 101 | 103 |
| BATTERY B55 | 1.50 | 2.30 | 101 | 105 |
| BATTERY B56 | 1.50 | 2.15 | 102 | 107 |
| BATTERY B57 | 1.50 | 2.00 | 103 | 109 |
| BATTERY B58 | 1.50 | 1.90 | 102 | 107 |
| BATTERY B59 | 1.50 | 1.80 | 101 | 103 |
| BATTERY B60 | 1.50 | 1.70 | 99 | 96 |

Table 3 shows that among batteries B37-B44 using manganese dioxide in which the content of anatase titanium dioxide in a positive electrode was 0.10 mass %, batteries B38-B43 in each of which the half-width was 1.80-2.40 degrees showed improved discharge performance under each of a low load and an intermediate load, as compared to battery B37 using manganese dioxide whose half-width was 2.60, such as conventional batteries.

Batteries B40-B42 in each of which the half-width was 1.90-2.15 degrees showed more improved discharge performance under each of a low load and an intermediate load.

Battery B44 in which the half-width was 1.70 degrees did not show improved discharge performance. This is because an excessively small half-width, i.e., excessively regular crystalline arrangement, of the 110 plane peak extremely reduces Mn vacancy sites in the crystal structure to hinder hydrogen ion conduction necessary for discharge reaction.

Batteries B45-B52 and B53-B60 in which the contents of anatase titanium dioxide in the positive electrodes were 0.40 mass % and 1.50 mass % showed similar tendency. Among these batteries, batteries B46-B51 and B54-B59 in each of which the half-width was 1.80-2.40 degreed showed improved discharge performance under each of a low load and an intermediate load.

INDUSTRIAL APPLICABILITY

An alkaline battery according to the present disclosure exhibits excellent discharge performance and is suitably used for various types of equipment using dry batteries as power sources.

DESCRIPTION OF REFERENCE CHARACTERS 1 battery case
1a body
1b opening
2 positive electrode
3 negative electrode
4 separator
5 gasket
6 negative electrode current collector
7 negative electrode terminal plate
8 external label

The invention claimed is:

1. An alkaline battery in which a positive electrode containing manganese dioxide, a negative electrode, and a separator interposed therebetween are housed in a closed-end cylindrical battery case whose opening is sealed with a gasket, wherein
   a half-width of a 110 plane peak of the manganese dioxide measured by a powder X-ray diffraction analysis is in the range of more than 2 degrees and 2.40 degrees or less, and
   anatase titanium dioxide is contained in the positive electrode such that a ratio of anatase titanium dioxide to the positive electrode is in the range of 0.10-1.50 mass %.

2. The alkaline battery of claim 1, wherein the ratio of anatase titanium dioxide to the positive electrode is in the range of 0.20-0.70 mass %.

3. The alkaline battery of claim 1, wherein the half-width is in the range of more than 2 degrees and 2.15 degrees or less.

4. The alkaline battery of claim 2, wherein the half-width is in the range of more than 2 degrees and 2.15 degrees or less.

* * * * *